US012631460B2

(12) United States Patent
Kanou et al.

(10) Patent No.: US 12,631,460 B2
(45) Date of Patent: May 19, 2026

(54) MOVING AVAILABILITY DETERMINATION DEVICE AND A MOVING AVAILABILITY DETERMINATION METHOD

(71) Applicant: TOYOTA JIDOSHA KABUSHIKI KAISHA, Toyota (JP)

(72) Inventors: Takeshi Kanou, Seto (JP); Takuro Sawano, Nisshin (JP); Shogo Yasuyama, Okazaki (JP); Kento Iwahori, Nagoya (JP); Keigo Ikeda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 18/648,571

(22) Filed: Apr. 29, 2024

(65) Prior Publication Data

US 2024/0393120 A1 Nov. 28, 2024

(30) Foreign Application Priority Data

May 23, 2023 (JP) ................................. 2023-084239

(51) Int. Cl.
*G01C 21/34* (2006.01)

(52) U.S. Cl.
CPC ................................. *G01C 21/3461* (2013.01)

(58) Field of Classification Search
CPC ................................................ G01C 21/3461
See application file for complete search history.

(56) References Cited

U.S. PATENT DOCUMENTS

| | | | |
|---|---|---|---|
| 2007/0038362 A1* | 2/2007 | Gueziec | G08G 1/096827 340/905 |
| 2015/0081200 A1* | 3/2015 | Wang | B25J 9/1676 701/301 |
| 2017/0320529 A1* | 11/2017 | Nordbruch | G05D 1/0212 |
| 2020/0073399 A1 | 3/2020 | Tateno et al. | |
| 2022/0253071 A1* | 8/2022 | Thode | G05D 1/246 |
| 2022/0266709 A1 | 8/2022 | Hinata et al. | |
| 2022/0413506 A1* | 12/2022 | Pydin | G05D 1/0274 |

FOREIGN PATENT DOCUMENTS

| | | |
|---|---|---|
| JP | 2017-538619 A | 12/2017 |
| JP | 2020-038631 A | 3/2020 |
| JP | 2021-079744 A | 5/2021 |

* cited by examiner

*Primary Examiner* — Khoi H Tran
*Assistant Examiner* — Tristan J Greiner
(74) *Attorney, Agent, or Firm* — Oliff PLC

(57) ABSTRACT

A moving availability determination device comprises a route acquisition unit that acquires a candidate movement route, an information acquisition unit that acquires determination basis information including at least one of the following information: moving object feature information indicating at least one of a specification related to the movement of a moving object and a dimension of the moving object; speed condition information indicating a condition of the moving speed of the moving object in a target moving route; and structure information indicating at least one of a position and a size of a structure in a region including the target movement route, and a determination unit that executes a determination of whether the candidate movement route generated by the route acquisition unit is the movable route, using the determination basis information.

4 Claims, 6 Drawing Sheets

SECOND EMBODIMENT

Fig.6

SECOND EMBODIMENT

MOVING AVAILABILITY DETERMINATION DEVICE AND A MOVING AVAILABILITY DETERMINATION METHOD

This application claims priority based on Japanese Patent Application No. 2023-84239, filed on May 23, 2023, the entire disclosure of which is incorporated herein by reference.

BACKGROUND

Field

The present disclosure relates to a determination of whether or not a target movement route is a movable route.

Related Art

A system in which a target movement route is transmitted to a moving object and a moving object moves according to the received target movement route has been variously proposed (for example, refer to JP2017-538619A).

However, in the conventional system, there is a possibility that the target movement route to be instructed is a route in which the moving object can not actually move. Therefore, a technique capable of setting a route in which the moving object can actually move as a target moving route is desired.

SUMMARY

According to one aspect of the present disclosure, there is provided a moving availability determination device for determining whether or not a target movement route for instructing a moving object that moves in accordance with the target movement route is a moveable route for the moving object The moving availability determination device includes a route acquisition unit for acquiring a candidate movement route that is a candidate route of the target movement route, an information acquisition unit for acquiring determination basis information including at least one of the following information: moving object feature information indicating at least one of a specification related to a movement of the moving object and a dimension of the moving object; speed condition information indicating a condition of a moving speed of the moving object in the target moving route; and structure information indicating at least one of a position and a size of a structure in a region including the target movement route, and a determination unit for executing a determination of whether or not the candidate movement route generated by the route acquisition unit is the movable route, using the determination basis information.

BRIEF DESCRIPTION OF THE DRAWINGS

FIG. 6 is an explanatory view showing a target route setting window displayed on the display device in the step S135a.

DETAILED DESCRIPTION

A. First Embodiment

A1. System Configuration

Figure 1:
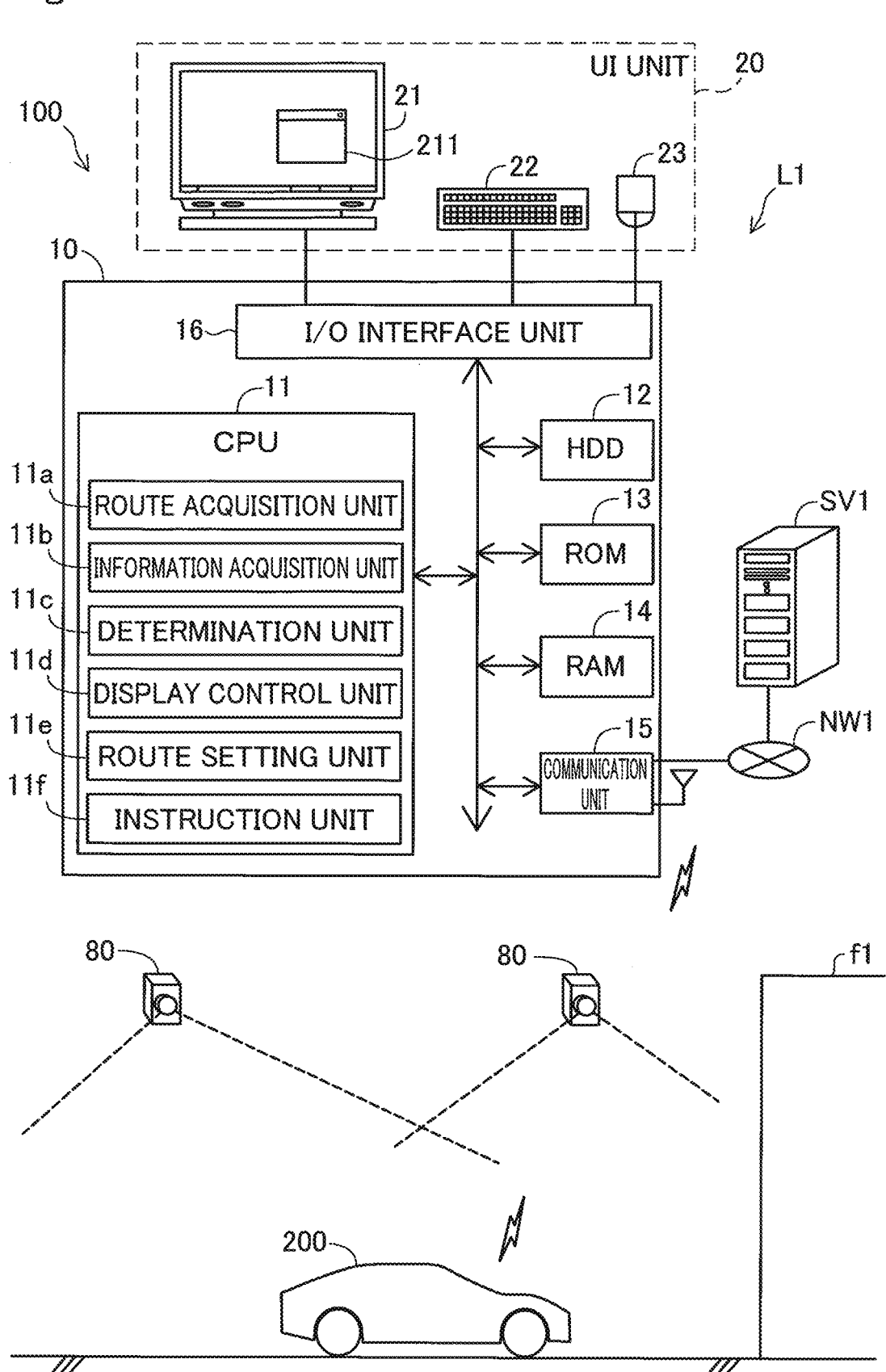
FIG. 1 is a block diagram showing a part of a manufacturing line applying the moving availability determination device as an embodiment of the present disclosure.

FIG. 1 is a block diagram illustrating a part of a manufacturing line L1 in which a moving availability determination device 100 according to an embodiment of the present disclosure is applied. The moving availability determination device 100 determines whether or not the target movement route instructed to the moving object 200 is a route (hereinafter, referred to as "movable route") which can be moved by the moving object 200. In this embodiment, the moving object 200 is a vehicle. "Vehicle" has a broad meaning including vehicles in the finished state as a product, as well as vehicles in the state of semi-finished products and work-in-process products in the middle of manufacturing. The moving object 200 is not limited to a vehicle and may be any type of moving object such as a ship, an aircraft, or a robot. The manufacturing line L1 is a manufacturing line for the mobile 200, besides the premises of the factory, may be provided in an area outside the premises of the factory, such as a parking lot.

The moving object 200 is remotely controlled and automatically moves by the moving availability determination device 100. Specifically, the moving object 200 moves in accordance with the target movement route instructed from the moving availability determination device 100. In the present exemplary embodiment, the "target movement route" includes the coordinates of the position where the moving object 200 should be a traveling target (hereinafter, referred to as "target position coordinates") and the vehicle speed. The moving object 200 executes a moving operation including driving, steering, and braking, based on the target position coordinates received from the moving availability determination device 100 and the vehicle speed. At this time, the moving object 200 specifies the current position and the posture of the moving object 200 by using the detection result of the detecting device 80 such as a camera or a LIDAR installed in the factory or outside the factory, and controls the moving operation according to the specified current position and the posture.

In the present embodiment, the moving availability determination device 100 is configured as a computer. The mobile availability determination device 100 is configured to communicate with the production-management-server SV1 through a networked NW1. The production control server SV1 manages the production of the moving object 200 in the production line L1.

The moving availability determination device 100 includes a main body portion 10, a user interface unit (UI unit) 20. The user interface unit 20 includes a display device 21, a keyboard 22, and a mouse 23. The display device 21 displays an input window 211 for inputting at least a part of conditions (hereinafter, referred to as "route decision conditions") for deciding a route (hereinafter, referred to as "candidate movement route") as a candidate of the target movement route. Accordingly, the user interface unit 20 can be said to be a function unit that accepts the input of the route determination condition.

The main body 10 includes a CPU11, a hard disk (HDD) 12, a ROM13, a RAM14, a communication unit 15, and an input/output interface unit 16. CPU11 functions as a route acquiring unit 11a, an information acquiring unit 11b, a determination unit 11c, a display control unit 11d, a route setting unit 11e, and an instruction unit 11f by RAM14 developing and executing a control program previously stored in the hard disk 12.

The route acquiring unit 11a acquires the candidate movement routes. In the present exemplary embodiment, the route acquiring unit 11a acquires the candidate movement route by generating the candidate movement route using the route decision condition inputted from the input window 211.

The information acquiring unit 11b acquires the determination basis information. "Judgment ground information" is information used as a ground in judging whether a candidate movement route is a moveable route or not. In the present exemplary embodiment, the determination basis information includes the moving object characteristic information, the speed condition information, and the structure information. The determination basis information may not include a part of the moving object feature information, the speed condition information, and the structure information.

The "moving object characteristic information" is information indicating at least one of the specifications related to the movement of the moving object 200 and the dimension of the moving object 200. In the present exemplary embodiment, the "specification related to the movement of the moving object 200" includes the maximum cutting angle of the handle, the wheelbase, and the steering speed of the handle. In addition to or in place of at least a portion of these information, any other type of specifications relating to the movement of the mobile 200, such as tire size and tread, may be included in "specification related to the movement of the moving object 200." The dimensions of the moving object 200 include, for example, the overall length, the vehicle height, the vehicle width, and the like.

The "speed condition information" is information indicating the condition of the moving speed of the moving object 200 in the target movement route. Specifically, in the present embodiment, the speed condition information is the lowest vehicle speed of the moving object 200 in the target movement route. The minimum vehicle speed is determined from the tact time in the manufacturing-line L1.

"Structure information" is information indicating at least one of the positions and the size of the structure in the area including the target movement route. "Structure" has a broad meaning including, for example, production equipment such as industrial robots and conveyors, as well as pillars of buildings, gates, and work areas of workers.

The determination unit 11c performs determination of whether or not the candidate movement route acquired by the route acquiring unit 11a is a movable route using the determination basis information. The display control unit 11d displays the corrected candidate moving route on the display device 21. "Corrected candidate movement route" is a route in which a candidate movement route is corrected by changing a part of a route decision condition. The route setting unit 11e determines and sets a target movement route. The instructing unit 11f instructs the moving object 200 to perform the target moving route set by the route setting unit 11e.

The communication unit 15 includes a radio communication interface for communicating with the mobile unit 200 and a wired communication interface for communicating with the production-management-server SV1. The communication unit 15 may include only one of a wireless communication interface and a wired communication interface.

A2. Route Movement Availability Determination Process

Figure 2:
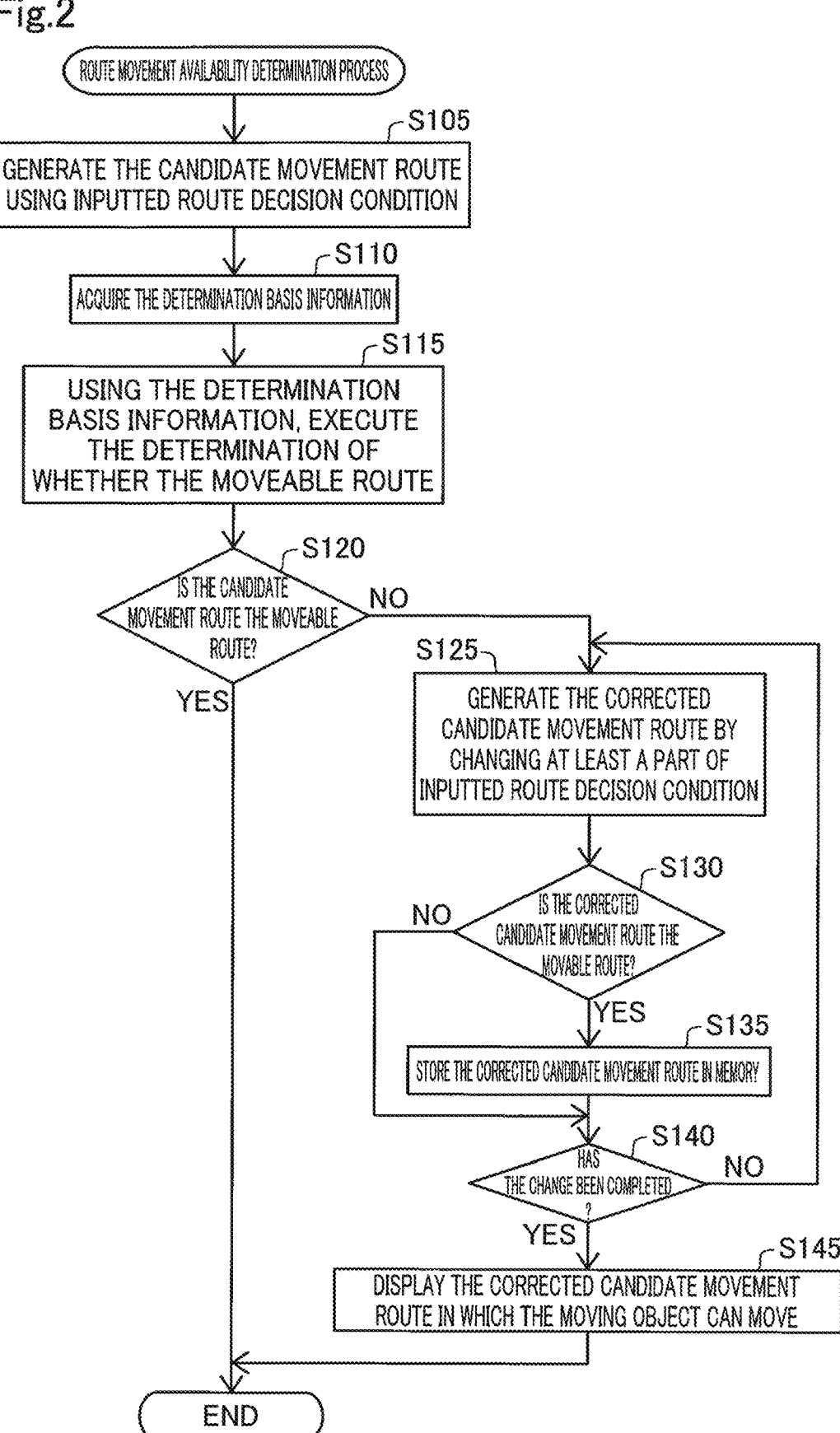
FIG. 2 is a flowchart showing the procedure of the route movement availability determining process in the first embodiment.

FIG. 2 is a flowchart illustrating a procedure of a route movement availability determination process according to the first embodiment. When the user instructs the execution of the target route setting menu in conjunction with the input of the route determination condition to the input window 211, the route movement availability determination process illustrated in FIG. 2 is executed in the movement availability determination device 100. For example, when creating a new manufacturing line L1, when changing the layout of the facility in the manufacturing line L1, or in order to set or change the target movement route in such cases where the manufacturing target vehicle type in the manufacturing line L1 is changed, the execution of the target route setting menu is instructed by the user, the route movement availability determination process is executed.

In the step S105, the route acquiring unit 11a generates the candidate movement route using the route decision condition inputted by the user.

Figure 3:
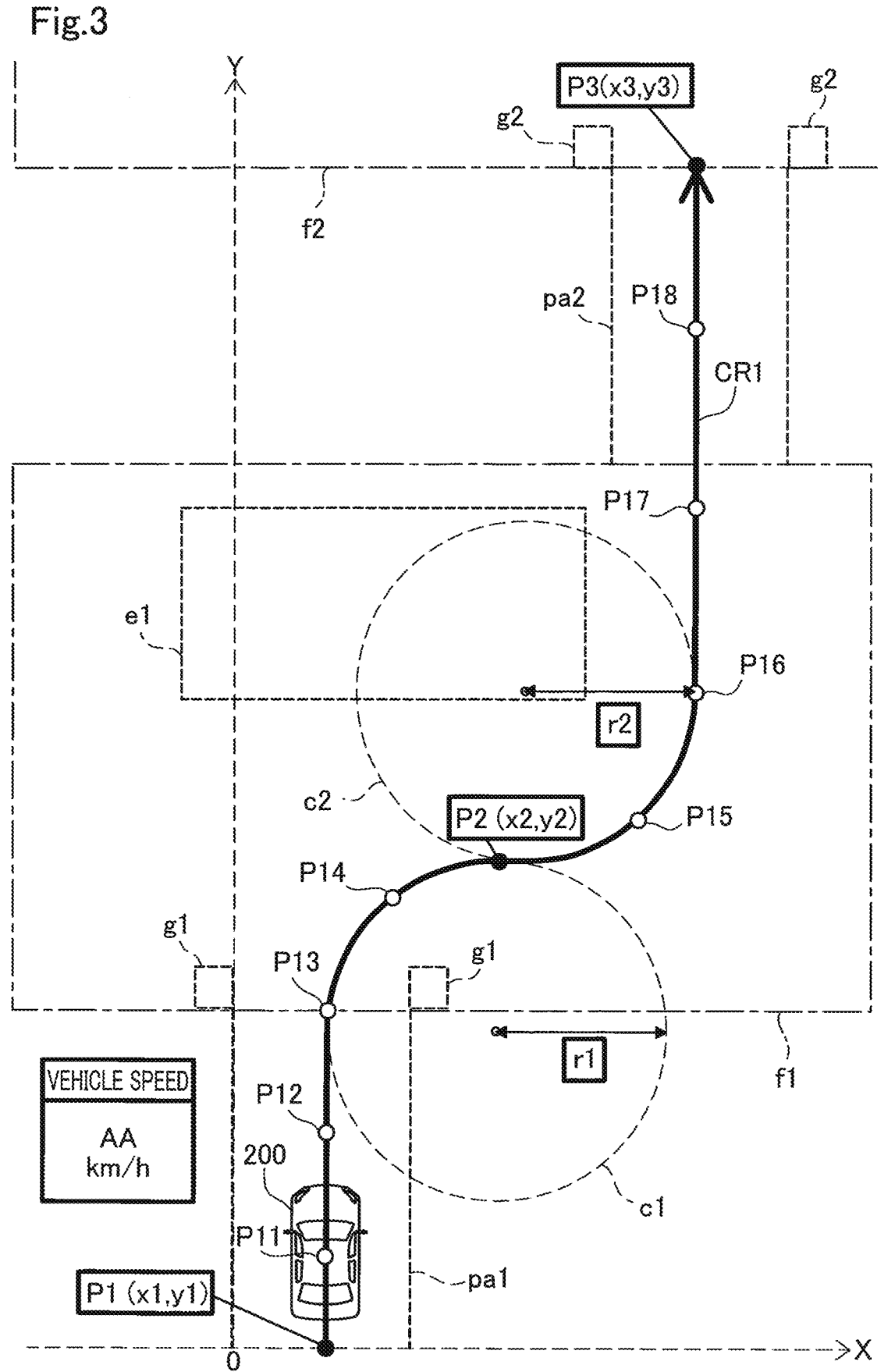
FIG. 3 is an explanatory view showing an example of a candidate movement route to be generated.

FIG. 3 is an explanatory diagram illustrating an exemplary candidate-moving-route CR1 that is generated. In the embodiment of FIG. 3, the moving object 200 enters the first building f1 through the first passage pa1, exits the first building f1 after passing beside the facility e1 in the first building f1, and passes through the second passage pa2 to the second building f2 candidate movement route CR1 are generated. The end point of the first passage pa1 is the gated g1 at the entrance of the first building f1. The end point of the second building f2 is the gated g2 at the entrance of the second building f2.

The route determination conditions entered by the user are six conditions (i) to (vi) below.

(i) Position co-ordinate of start point P1 (x1, y1)
(ii) Position co-ordinate of end point P3 (x3, y3)
(iii) Position co-ordinate (x2, y2) of steering wheel switchback point P2
(iv) First r1 of radii of curvature
(v) r2 of second curvature
(vi) Vehicle speed AA (km/h)

The switchback point P2 is the point at which switchback of the steering wheel is initiated. In the present embodiment, the candidate movement route CR1 is generated as a route in which a line segment having a start point P1 and an end point P3 as end points, respectively, are connected by a route in which two arcs are consecutive. Therefore, switching back of the handle occurs at a position where the two arcs are connected. The first radius of curvature r1 is the radius of curvature of the arc part of the front side (the side close to the starting point P1). The second radius of curvature r2 is the radius of curvature of the arc part of the back side (the side closer to the end point P3). The vehicle speed AA is a vehicle speed when the moving object 200 travels in the candidate movement route CR1.

The route acquiring unit 11a sets two circle c1, c2 based on the inputted route decision conditions. The route acquiring unit 11a identifies a route indicated by a thick solid line by using a straight line having a start point P1 and an end point P3 as end points, respectively, and two circle c1, c2. The route acquiring unit 11a specifies eight point P11~P18 on such a route. For example, the contact point between the straight line and the circular c1 with the start point P1 as an end point is specified as a point P13. Next, the route acquiring unit 11a specifies two point P11, P12 for dividing between the start point P1 and the point P13 into three equal parts. Next, the route acquiring unit 11a, a point P13, the arc between the cutting point P2, to identify a point P14 for bisecting along the arc. Similarly, the route acquiring unit 11a specifies the point P15~P18. Route acquiring unit 11a, the start point P1, the return point P2, the end point P3, between each point of the point P11~P18, specifies the target position for each predetermined distance. For example, the target position may be specified for each 50 cm. The route acquiring unit 11a specifies the coordinates of the start point P1, the switch-back point P2, the end point P3, the point P11~P18, and all the target positions as the target position coordinates as well as specifies the vehicle speed AA inputted by the user as the vehicle speed, thereby generating the candidate movement route CR1.

As shown in FIG. 2, in the step S110, the information acquiring unit 11b acquires the determination basis information. Specifically, the information acquiring unit 11b acquires the moving object characteristic information and the speed-condition information from the production-management-server SV1 and acquires the structural information from the hard disk 12.

Determination unit 11c, using the determination basis information acquired in step S110, the candidate moving route CR1 generated in the step S105 to perform the determination of whether the movable route (step S115). Specifically, the determination unit 11c simulates the movement of the moving object 200 according to the candidate movement route CR1 shown in FIG. 3 and determines whether or not the following conditions (I) to (IV) are satisfied.

(I) The center position of the movable body 200 is within the allowable lateral deviation range in the vehicle width direction over the entire route.
  (II) Target steering angle is less than or equal to the allowable maximum steering angle.
  (III) The distance between the mobile 200 and the structure is equal to or greater than a predetermined threshold distance.
  (IV) Vehicle speed is equal to or above the minimum vehicle speed.

When all of the above-described conditions (I) to (IV) are satisfied, the determination unit 11c determines that the candidate movement route CR1 is a movable route, and when at least a part of the above-described conditions (I) to (IV) is not satisfied, it determines that the candidate movement route CR1 is not a movable route.

If it is determined that the candidate movement route CR1 is a moveable route (S120: YES), the process ends. The route setting unit 11e sets the candidate movement route CR1 as the target movement route, and the instruction unit 11f instructs the moving object 200 to perform the set target movement route.

In contrast, when it is determined that the candidate movement route CR1 is not the movable route (Step S120: NO), the route acquiring unit 11a generates the corrected candidate movement route by changing at least a part of the inputted route decision condition (Step S125). In the present embodiment, the changed object in the step S125 is the first radius of curvature r1 and the second radius of curvature r2. The route acquiring unit 11a generates a corrected candidate movement route by changing the first radius of curvature r1 and the second radius of curvature r2 one by one.

The determination unit 11c executes the determination of whether or not the corrected candidate movement route is a movable route (step S130). When it is determined that the corrected candidate movement route is a moveable route (step S130: YES), the determination unit 11c stores the corrected candidate movement route in ROM13 (step S135). After completion of the step S135, or when it is determined that the corrected candidate movement route is not the movable route (step S130: NO), the route acquiring unit 11a determines whether or not the change of all the route decision conditions to be changed has been completed (step S140).

If it is determined that the change of all the route decision conditions has not been completed (step S140: NO), the process returns to the step S125. In this situation, the modified moving route is generated by changing the unchanged route decision condition, and the steps S130~S140 is executed. In contrast, when it is determined that the change of all the route decision conditions has been completed (step S140: YES), the display control unit 11d causes the display device 21 to display the corrected candidate movement route in which the moving object 200 can move (step S145).

Figure 4:
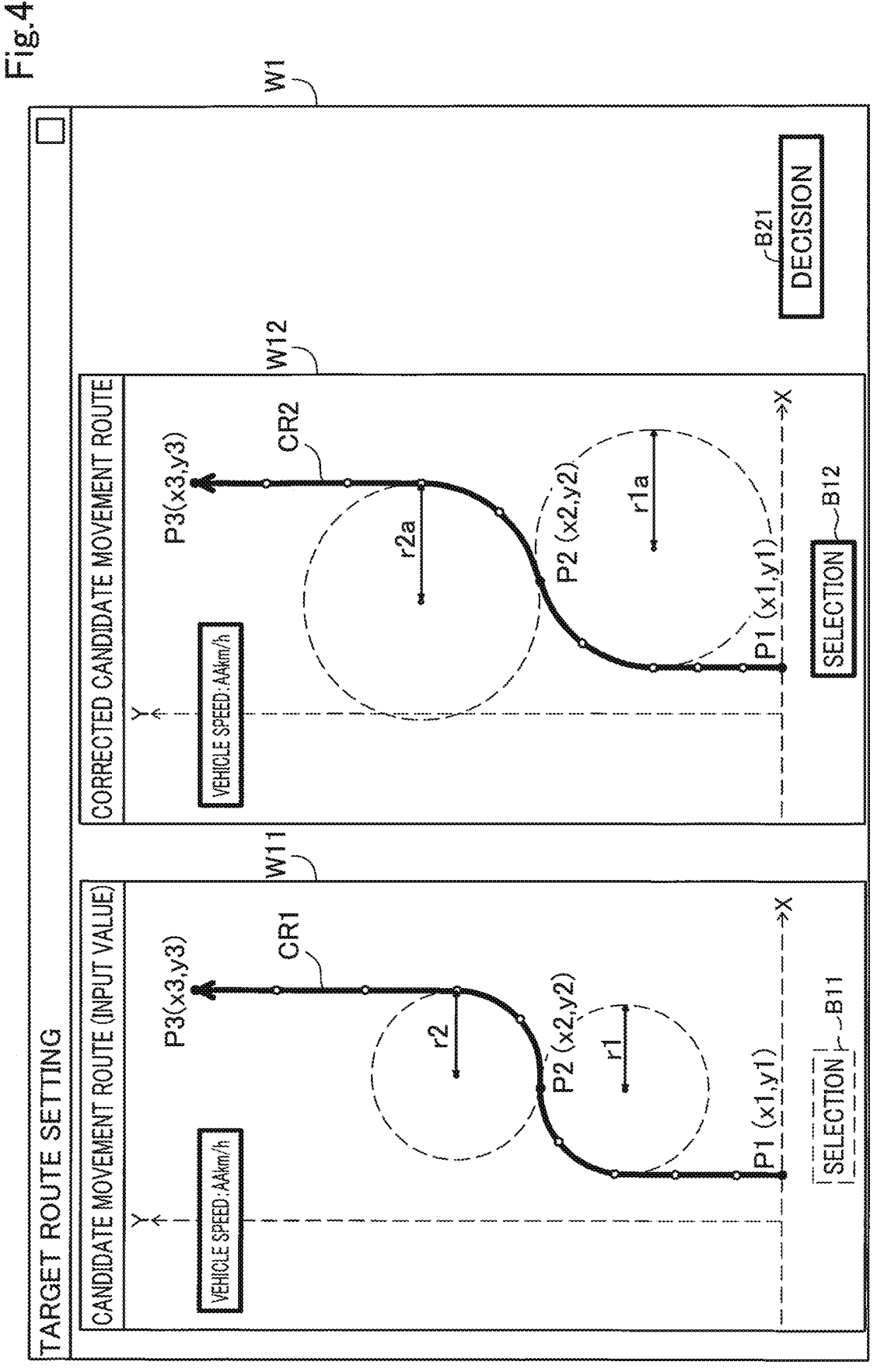
FIG. 4 is an explanatory view showing a target route setting window displayed on the display device in the step S145.

FIG. 4 is an explanatory diagram illustrating a target route setting window W1 that is displayed on the display device 21 in the step S145. The target route setting window W1 includes a candidate movement route display unit W11, a corrected candidate movement route display unit W12, and a decision-button B21.

The candidate movement route CR1 is displayed on the candidate movement route display unit W11. Candidate moving route indicator W11 is provided with a selection-button B11. However, as shown in FIG. 4, the selec-button B11 is grayed out. Therefore, the user cannot press the select-button B11.

The corrected candidate movement route CR2 is displayed on the corrected candidate movement route display unit W12. Corrected candidate movement route CR2, the first radius of curvature is a first radius of curvature r1a larger than the first radius of curvature r1, in that the second radius of curvature is a second radius of curvature r2a larger than the second radius of curvature r2, unlike the candidate moving route CR1, the other route determination conditions are the same. According to the corrected candidate movement route CR2, the steering angle needs to be smaller than the candidate movement route CR1. Corrected candidates movement route indicator W12 is provided with a selection-button B12. The display state of the selection-button B12 is a depressable state.

The user can easily know that the candidate movement route CR1 generated by using the route decision condition that he/she entered is not a movable route because the selection-button B11 is grayed out in the candidate movement route display unit W11. Further, by the corrected candidate movement route CR2 is displayed in the corrected candidate movement route display unit W12, it is possible to easily know what kind of route the moving object 200 can move. Then, the select-button B12 is pressed by the user to select the corrected candidate movement route CR2, by the determination button B21 is pressed, the corrected candidate movement route CR2 is determined as the target movement route and set. After the completion of the step S145, the route movement availability determination process ends.

Since the moving availability determination device 100 of the first embodiment described above acquires the determination basis information including the moving object characteristic information, the speed condition information, and the structural information, and determines whether or not the candidate movement route CR1 is a moveable route using the determination basis information, the candidate movement route CR1 that can be actually moved by the moving object 200 can be set as the target movement route.

Further, since the movement possibility determination device 100 generates the candidate movement route CR1 using the route determination criteria inputted from the user interface unit 20, it is possible to generate the candidate movement route CR1 according to the user's intention. Therefore, as a target movement route, a route according to the user's intention or a route similar to a route according to the user's intention can be set. Further, since the moving availability determination device 100 displays the corrected candidate movement route CR2 on the display device 21, the user can easily know what kind of route the moving object 200 is movable. For this reason, the user can omit labor such as identifying a route decision condition capable of generating a moveable route by trial and error.

B. Second Embodiment

The apparatus configuration of the movement availability determining apparatus 100 of the second embodiment is the same as the apparatus configuration of the movement availability determining apparatus 100 of the first embodiment shown in FIG. 1.

Figure 5:
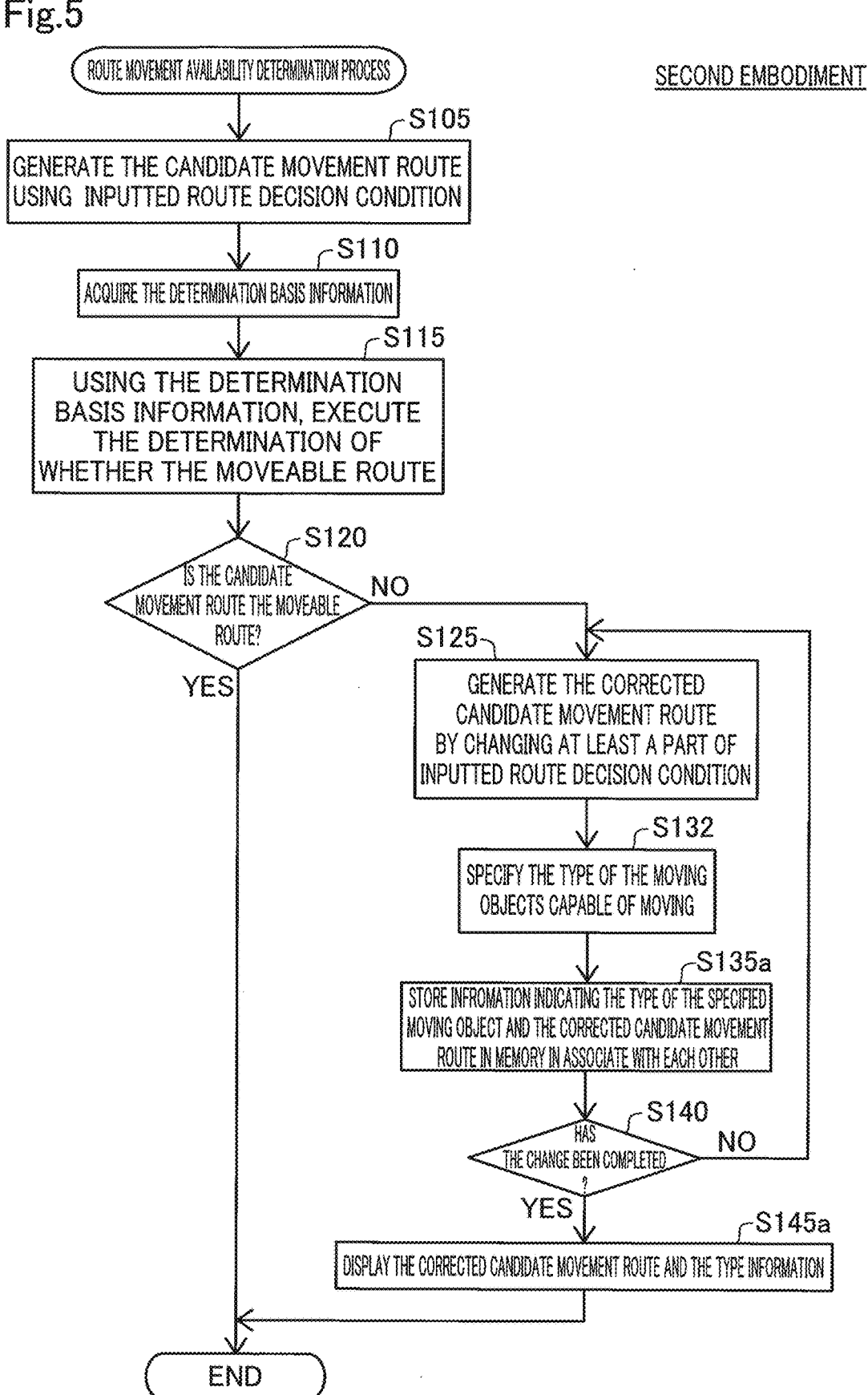
FIG. 5 is a flowchart showing the procedure of the route movement availability determining process in the second embodiment.

FIG. 5 is a flowchart illustrating a procedure of a route movement availability determination process according to the second embodiment. The route movement availability determination process according to the second embodiment differs from the route movement availability determination process according to the first embodiment shown in FIG. 2 in that step S132 is executed instead of step S130, step S135a is executed instead of step S135, and step S145a is executed instead of step S145.

The determination unit 11c specifies the types of the moving objects capable of moving on the respective routes with the candidate movement route CR1 generated in the step S105 and the corrected candidate movement route CR2 generated in the step S125 as objects (step S132). Specifically, the determination unit 11c changes the moving object characteristic information, out of the determination basis information acquired in the stepping S110, into the moving object characteristic information of the other vehicle type. Then, the determination unit 11c performs simulations of vehicle moving for the respective candidate movement route CR1, CR2 and determines whether or not the above-described conditions (I) to (IV) are satisfied.

The determination unit 11c, as a result of the step S132, stores information (hereinafter, referred to as "type information") indicating the type of the specified moving object and a corrected candidate movement route in ROM13 in association with each other (step S135a). Thereafter, when it is determined that the change of all the route decision conditions has been completed (Step S140: YES), the display control unit 11d causes the display device 21 to display the corrected candidate movement route and the type information in association with each other (Step S145a). Incidentally, the change object of step S125 in the second embodiment, the first radius of curvature r1, the second radius of curvature r2 and the return point P2.

Figure 6:
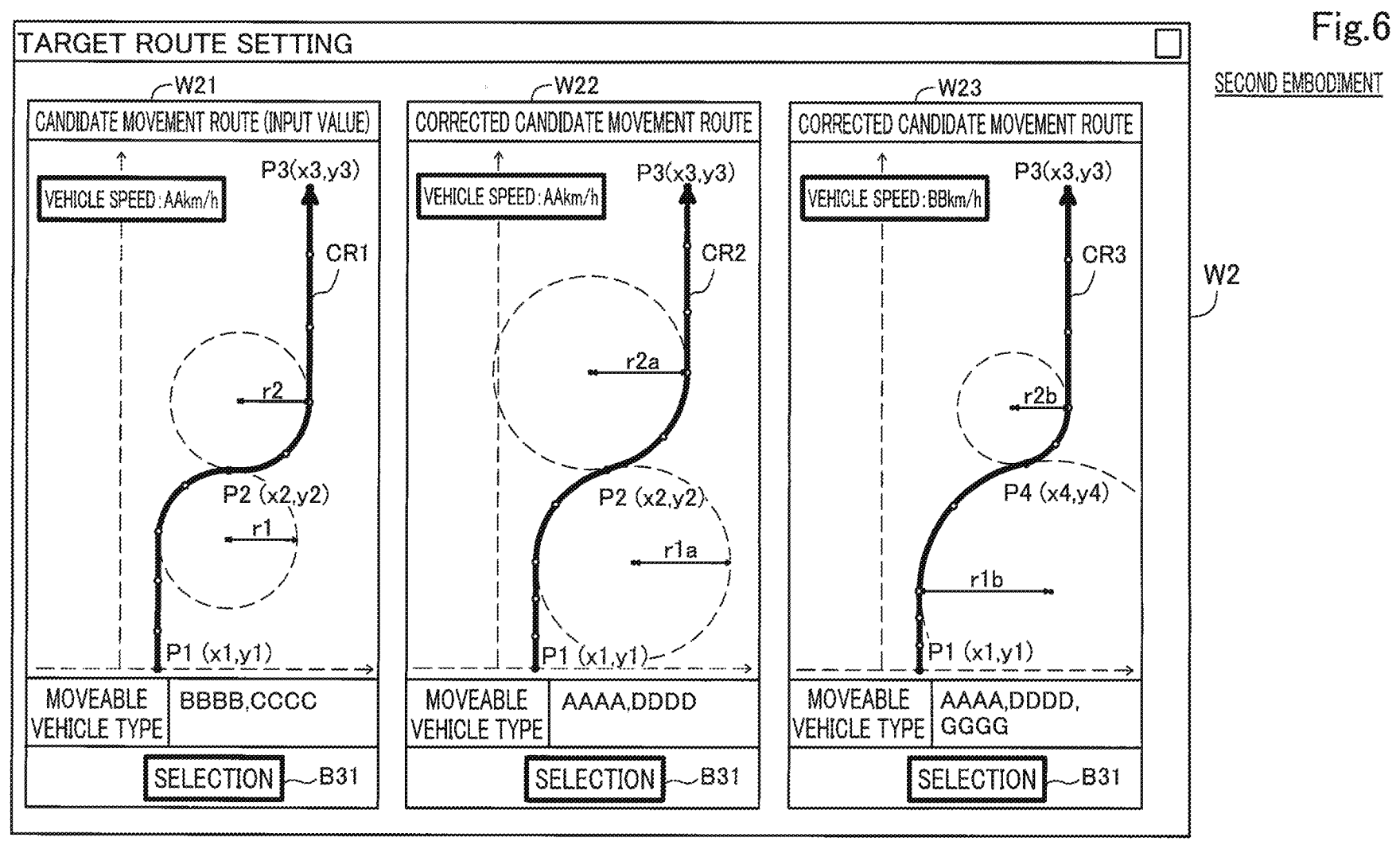

FIG. 6 is an explanatory diagram illustrating a target route setting window W2 that is displayed on the display device 21 in the step S135a. The target route setting window W2 includes a candidate movement route display unit W21 and two corrected candidate movement route display units W22, W23.

The candidate movement route CR1 is displayed on the candidate movement route display unit W21. The corrected candidate movement route CR2 is displayed on the corrected candidate movement route display unit W22. The corrected candidate movement route CR2 is the same as the corrected candidate movement route CR2 shown in FIG. 4 in the first embodiment. The corrected candidate movement route CR3 is displayed on the corrected candidate movement route display unit W23. The corrected candidate movement route CR3 is a route that is generated by changing the values of the first radius of curvature and the second radius of curvature from the values of the first radius of curvature r1, r1a and the second radius of curvature r2, r2a in the candidate movement route CR1 and the modified candidate movement route CR2, changing the switch-back point from the switch-back point P2 to the switch-back point P4 (x4, y4), and changing the vehicle speed from AA to BB.

The type data, that is, the moveable vehicle type, is displayed on each of the display unit W21~W23. Incidentally, in FIG. 6, schematic type information such as "AAAA" are used as the movable vehicle type. Each indicator W21~W23 is provided with a selection-button B31. The user can select a candidate movement route CR1 or any corrected candidate movement route CR2, CR3 as a target movement route by pressing the select-button B31. Further, in another screen (not shown), it is possible to select the vehicle type.

The Moving availability determination device 100 of the second embodiment described above has the same effect as the moving availability determining device 100 of the first embodiment. In addition, the user can easily know what kind of route can be moved if what kind of moving object is used. Therefore, the user can set the target movement route in which the moving object can move even when the route decision condition is limited.

C. Other Embodiments (C1) In the respective embodiments, the candidate movement routes are generated by using the route decision conditions inputted by the route obtaining unit 11a from the user interface unit 20. However, the present disclosure is not limited thereto. Another device (not shown) generates a candidate movement route, and the route acquiring unit 11a may acquire the candidate movement route from the other device. Further, for example, instead of inputting the route decision condition by the user, the user draws the route as indicated by the bold line in FIG. 3 on the route generation menu screen. Based on the drawn route, the route acquiring unit 11a may derive the start point P1, the cut-back point P2, the end point P3, the first radius-of-curvature r1, and the second radius-of-curvature r2 to set up the candidate movement route. Further, the corrected candidate movement route, the route acquiring unit 11a, the start point P1, the return point P2, the end point P3, the first radius of curvature r1, at least one of the second radius of curvature r2 may be generated autonomously arbitrarily.

(C2) In the first embodiment, the moveable corrected candidate movement route is displayed on the display device 21, but the present disclosure is not limited thereto. When the moveable corrected candidate movement route is specified, the display control unit 11d may omit displaying the route specified in the display device 21 and determine the route in which the route setting unit 11e is specified as the target movement route.

(C3) In the respective embodiments, at least one of the route setting unit 11e and the instruction unit 11f may be configured to be provided by another device, for example, a production-management-server SV1, which differs from the moving availability determination device 100, in place of the moving availability determination device 100. Further, the display device 21 has been provided with the movement availability determining device 100, may be configured to other devices different from the moving availability determination device 100.

(C4) Conditions used in the determination of whether or not the candidate movement route CR1 is a movable route are not limited to the above-mentioned (I) to (IV). For example, in a configuration in which the detecting device 80 includes the imaging device, a condition that "the moving object 200 moves within an imaging range capable of capturing an image of accurately recognizing the moving object 200" may be used in place of at least a part of conditions (I) to (IV), or in addition to conditions (I) to (IV), for determining whether or not a moveable route is used.

(C5) In the step S125 of the respective embodiments, among the route decision conditions, the first radius of curvature r1 and the second radius of curvature r2 are targeted to change, but the present disclosure is not limited thereto. In addition to the first radius of curvature r1 and the second radius of curvature r2, or in place of at least one of the first radius of curvature r1 and the second radius of curvature r2, at least one of the start point P1, the return point P2, the end point P3 and the vehicle speed may be changed. In addition, a priority may be provided for the conditions of (i) to (vi) above, and the lower condition of the priority may be changed in priority. For example, set the highest priority for the start point P1 and the end point P3, set the second highest priority in the cutting point P2, the first radius of curvature r1 and the second radius of curvature r2 set the lowest priority, first, the first radius of curvature r1 and the second radius of curvature r2 may be changed target. Then, when the movable route is not identified, it may be the switching point P2 as a change target. With such a configuration, it is possible to generate a corrected candidate movement route reflecting the user's intention for each condition.

(C6) In the respective embodiments, a portion of the configuration that has been implemented by hardware may be replaced by software, and conversely, a portion of the configuration that has been implemented by software may be replaced by hardware. For example, at least one of the functional unit of the route acquiring unit 11a, the information acquiring unit 11b, the determining unit 11c, the display control unit 11d, the route setting unit 11e, and the instruction unit 11f may be implemented by an integrated circuit, a discrete circuit, or a module that combines these circuits. Also, if some or all of the functions of the Disclosure are implemented in software, the software (computer program) may be provided in a form stored on a computer-readable recording medium. A "computer-readable recording medium" is not limited to a portable recording medium such as a flexible disk or a CD-ROM, but also includes an internal storage device in a computer such as a variety of RAM and ROM, and an external storage device fixed to a computer such as a hard disk. That is, the term "computer-readable recording medium" has a broad meaning that includes any recording medium capable of fixing data packets rather than temporarily.

The present disclosure is not limited to the above-described embodiments and can be realized with various configurations without departing from the spirit thereof. For example, the technical features in each embodiment may be replaced or combined as appropriate in order to solve some or all of the above-described problems or to achieve some or all of the above-described effects. In addition, if the technical features are not described as indispensable in this specification, they can be deleted as appropriate. For example, the present disclosure may be realized by aspects described below.

(1) According to one aspect of the present disclosure, there is provided a moving availability determination device for determining whether or not a target movement route for instructing a moving object that moves in accordance with the target movement route is a moveable route for the moving object The moving availability determination device includes a route acquisition unit for acquiring a candidate movement route that is a candidate route of the target movement route, an information acquisition unit for acquiring determination basis information including at least one of the following information: moving object feature information indicating at least one of a specification related to a movement of the moving object and a dimension of the moving object; speed condition information indicating a condition of a moving speed of the moving object in the target moving route; and structure information indicating at least one of a position and a size of a structure in a region including the target movement route, and a determination unit for executing a determination of whether or not the candidate movement route generated by the route acquisition unit is the movable route, using the determination basis information.

The moving availability determination device of this aspect acquires the determination basis information including at least one information of the moving object feature information, the speed condition information, and the structure information, and determines whether or not the candidate movement route is a moveable route by using the determination basis information. Therefore, the candidate movement route in which the moving object can actually move can be set as the target movement route.

(2) The moving availability determination device of the above aspect may further include a user interface unit for accepting input of a route determination condition that is at least some of conditions for determining the candidate movement route, wherein the route acquisition unit generates the candidate movement route using the route determination condition input from the user interface unit.

The moving availability determination device of this aspect can generate a candidate movement route according to the intention of the user. Therefore, as a target movement route, a route according to the user's intention or a route similar to a route according to the user's intention can be set.

(3) The moving availability determination device of the above aspect may further include a display control unit. In the moving availability determination device of the above aspect, when it is determined that the candidate movement route is not the moveable route, the route acquisition unit may modify the candidate movement route by changing at least some of the route determination condition input from the user interface unit to generate a corrected candidate movement route. In the moving availability determination device of the above aspect, the determination unit may execute the determination with respect to the corrected candidate movement route. In the moving availability determination device of the above aspect, when it is determined that the corrected candidate movement route is the moveable route, the display control unit may cause a display device to display the corrected candidate movement route.

According to the moving availability determination device of this aspect, the user can easily know what kind of route the moving object can actually move when the candidate moving route generated using the route determination condition inputted from the user interface part is not moveable by the moving object. For this reason, the user can omit labor such as identifying a route decision condition capable of generating a movable route by trial and error.

(4) The moving availability determination device of the above aspect may further include a display control unit. In the moving availability determination device of the above aspect, when it is determined that the candidate movement route is not the moveable route, the route acquisition unit may modify the candidate movement route by changing at least some of the route determination condition input from the user interface unit to generate a corrected candidate movement route. In the moving availability determination device of the above aspect, the determination unit may execute the determination with respect to the corrected candidate movement route, and when it is determined that the candidate movement route is not the moveable route, the determination unit executes the determination by changing the moving object feature information, In the moving availability determination device of the above aspect, when it is determined that the corrected candidate movement route is the moveable route, the display control unit may cause a display unit to display the corrected candidate movement route and type information corresponding to the moving object feature information of the moving object that can move in the corrected candidate movement route in association with each other.

According to the moving availability determination device of this aspect, the user can easily know what kind of route and what kind of moving object can be moved when the candidate mobile route generated using the route determination condition inputted from the user interface part is not moveable by the moving object. Therefore, the user can set the target movement route in which the moving object can move even when the route decision condition is limited.

The present disclosure can also be realized in various aspects. For example, it can be realized in the aspect of a moving availability determination method, a computer program for implementing a moving availability determination device or a moving availability determination method, a non-transitory storage medium storing such a computer program, or the like.

What is claimed is:

1. An apparatus for determining whether or not a target movement route for instructing a moving object that moves in accordance with the target movement route is a moveable route for the moving object, the apparatus comprising:
    a memory storing instructions;
    a processor configured to execute the instructions to:

acquire a candidate movement route that is a candidate route of the target movement route;
    acquire determination basis information including at least one of the following information: moving object feature information indicating at least one of a specification related to a movement of the moving object and a dimension of the moving object; speed condition information indicating a condition of a moving speed of the moving object in the target moving route; and structure information indicating at least one of a position and a size of a structure in a region including the target movement route; and
    execute a determination of whether or not the candidate movement route is a movable route, using the determination basis information; and
a user interface configured to accept input of a route determination condition that is at least some part of conditions for determining the candidate movement route, wherein
the processor is further configured to execute the instructions to
    generate the candidate movement route using the route determination condition input to the user interface,
    simulate a movement of the moving object according to the candidate movement route,
    determine whether or not the following conditions (I) to (IV) are satisfied,
        (I) the center position of the moving object is within an allowable lateral deviation range in a width direction of the moving object over the entire candidate movement route,
        (II) a target steering angle is less than or equal to a predetermined allowable maximum steering angle,
        (III) distance between the moving object and a structure around the moving object is equal to or greater than a predetermined threshold distance,
        (IV) speed of the moving object is equal to or greater than a predetermined minimum speed,
    determine, based on the simulated movement of the moving object according to the candidate movement route, that the candidate movement route is a movable route when all of the conditions (I) to (IV) are satisfied, and that the candidate movement route is not a movable route when at least one of the conditions (I) to (IV) is not satisfied.

2. The moving availability determination device according to claim 1,
    wherein
    the processor is further configured to execute the instructions to
        when it is determined that the candidate movement route is not the moveable route, modify the candidate movement route by changing at least some of the route determination condition input from the user interface to generate a corrected candidate movement route,
        execute the determination with respect to the corrected candidate movement route, and
        when it is determined that the corrected candidate movement route is the moveable route, cause a display device to display the corrected candidate movement route.

3. The moving availability determination device according to claim 1,
    wherein the determination basis information includes the moving object feature information, the processor is further configured to execute the instructions to when it is determined that the candidate movement route is not the moveable route, modify the candidate movement route by changing at least some of the route determination condition input from the user interface to generate a corrected candidate movement route, execute the determination with respect to the corrected candidate movement route, and when it is determined that the candidate movement route is not the moveable route, execute the determination by changing the moving object feature information, and when it is determined that the corrected candidate movement route is the moveable route, cause a display to display the corrected candidate movement route and type information corresponding to the moving object feature information of the moving object that can move in the corrected candidate movement route in association with each other.

4. A method for determining whether or not a target movement route for instructing a moving object that moves in accordance with the target movement route is a moveable route for the moving object, the method comprising:

acquiring a candidate movement route that is a candidate route of the target movement route;

acquiring determination basis information including at least one of the following information: moving object feature information indicating at least one of a specification related to a movement of the moving object and a dimension of the moving object; speed condition information indicating a condition of a moving speed of the moving object in the target movement route; and structure information indicating at least one of a position and a size of a structure in a region including the target movement route;

executing a determination of whether or not the candidate movement route generated is the moveable route, using the determination basis information;

accepting input of a route determination condition that is at least some part of conditions for determining the candidate movement route;

generating the candidate movement route using the route determination condition;

simulating a movement of the moving object according to the candidate movement route;

determining whether or not the following conditions (I) to (IV) are satisfied;

(I) the center position of the moving object is within an allowable lateral deviation range in a width direction of the moving object over the entire candidate movement route, (II) a target steering angle is less than or equal to a predetermined allowable maximum steering angle, (III) distance between the moving object and a structure around the moving object is equal to or greater than a predetermined threshold distance, (IV) speed of the moving object is equal to or greater than a predetermined minimum speed, determine, based on the simulated movement of the moving object according to the candidate movement route, that the candidate movement route is a movable route when all of the conditions (I) to (IV) are satisfied, and that the candidate movement route is not a movable route when at least one of the conditions (I) to (IV) is not satisfied.

* * * * *